INVENTORS
L. V. TRIGGIANI
M. G. SANCHEZ
G. E. ASHBY

BY Joseph P. Nigon

ATTORNEY

United States Patent Office 3,586,746
Patented June 22, 1971

3,586,746
METHOD OF MAKING A NUCLEAR FUEL PLATE
Leonard Vincent Triggiani, Silver Spring, Moises Gali Sanchez, Severna Park, and George Elliott Ashby, Highland, Md., assignors to W. R. Grace & Co., New York, N.Y.
Filed Feb. 28, 1968, Ser. No. 710,709
Int. Cl. G21c 21/02
U.S. Cl. 264—.5                             6 Claims

ABSTRACT OF THE DISCLOSURE

A process for improving the fuel-bearing phase of a dispersion type nuclear fuel plate, in which individual foils are impressed with cells of controlled dimension and shape in a regular array, and fuel particles containing the fissile materials are inserted into the cells by vibration, compression, suction, or other means. The foil is then laminated to additional foils to yield a unitized fuel plate with the fuel particles dispersed uniformly throughout.

---

Figure 1:
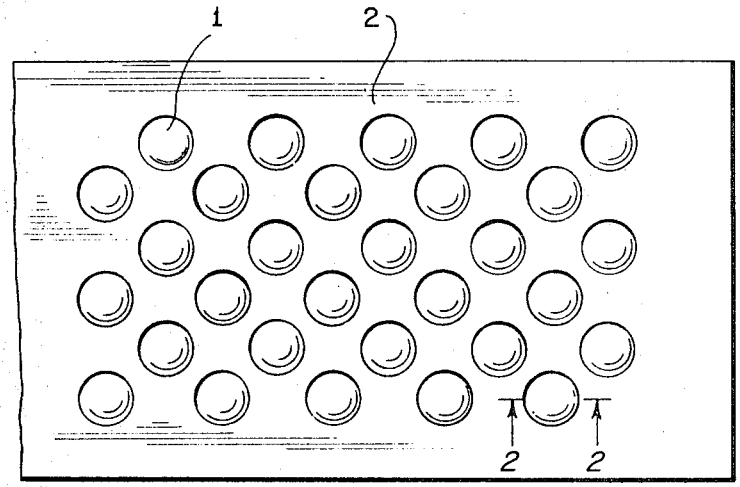

The use of heterogeneous fuels, the system in which the particles of fissile material are dispersed in or surrounded by a fuel free matrix, is growing rapidly. This system provides a structure in which fuel-bearing particles are present as individual small cells of fuel, each encapsulated within a matrix. The resulting composite is more stable under radiation than comparable homogeneous fuel materials because the operating life is increased through localization of fission fragment damage.

In this system, the damage produced by fission fragments is restricted to the fuel-bearing particle and coating material, if present, plus the surrounding matrix to a distance equal to the recoil range of the matrix material. In most solids, the recoil range is quite small, in the order of a few microns. Since this range is small, a fuel material can be designed in which thhe inter particle distance is greater than twice the recoil range, thus providing a matrix region undamaged by recoils during irradiation. A structural skeleton is thus provided that will maintain integrity as the fuel is consumed.

In one such system, a plate composed of zirconium, aluminum, stainless steel, Zircalloy, graphite, beryllia, alumina, aluminum alloys, or other metals with the fissionable material dispersed throughout has proved to be a reliable fuel form. Uranium dioxide has a high melting point, high density and has been a stable uranium chemical form. The metal plates or non-metallic strips such as beryllia, graphite, or alumina have provided stability, corrosion resistance, adequate or superior heat transfer properties, a lack of reactivity with $UO_2$ and other fissionable fuel particles, an inherent strength at high temperature and neutron fluxes. In addition, the properties of these metals and non-metals have made them potentially desirable as matrix materials for providing fuel loadings in the desired range.

The prior art methods of fabrication of dispersion fuels embody blending coated particles with a powdered precursor of the matrix material. Mixing in this manner results in a non-uniform distribution of the spherical fuel material and the matrix material. This non-uniformity is a serious drawback and is especially marked when the spherical fuel particles and the matrix precursor powder are of widely different particle sizes and shapes. Non-uniformity is also a serious problem when it is desirable to mix the fuel with additional components such as burnable poisons, (coated boron carbide particles, for example). Even under the most ideal mixing conditions, a certain amount of non-uniformity of particle distribution is inherent in this method owing to the wide distribution of sizes of the spherical fuel materials themselves as obtained by classical ceramic processing techniques.

During the mixing operation, fuel particles sometimes come in violent contact with each other. This leads to rupture of the particle coating and release of the fuel material into the matrix precursor. This may lead to rejection of the finished fuel element for poor quality. The released fuel would contaminate the matrix in the final fuel element and result in hot spot formation, damage to the matrix material and fission product release. Often such defects are undetected prior to loading a fuel element in a reactor. Fuel element failure during reactor operation leads to contamination of the coolant, the reactor environment and eventual reactor shutdown.

During the mixing operation, and the pressing and compaction operations which follow, the geometric non-uniformity of particle distribution and particle sizes and shapes, often lead to violent collision between particles which result in flattening and distention of the coated particles in such a manner as to produce stringering and micro cracks in the compacted fuel element. This behavior leads to the formation of hot spots in a reactor and also to the formation of cracks in the fuel element which result in fission product contamination of the fuel element matrix and the fuel element and reactor environment.

The introduction of microspheres such as are described in U.S. Pat. 3,331,785, has resulted in substantial improvements in fuel technology. This application and copending applications Ser. No. 710,707 and 710,708, filed of even date herewith, cover processes for utilizing these microsphere materials in fuel plates.

Figure 2:
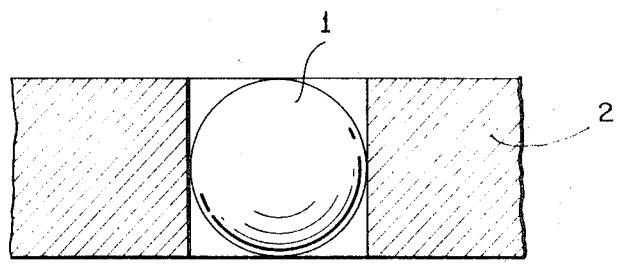
Figure 3:
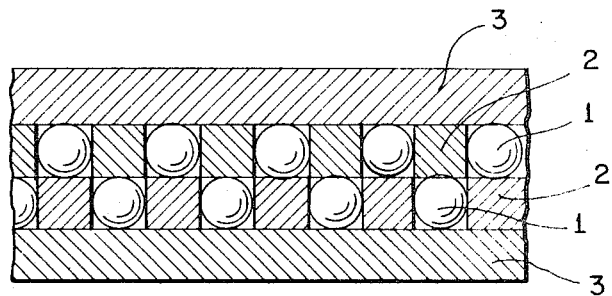

In order that the character of the foil and fuel plates may be better understood, reference should be made to the sheet of drawings in which the foil and fuel plate produced according to the invention are illustrated. In FIG. 1, there is illustrated an individual foil 2 containing the microspheres 1. FIG. 2 is a cross section along the lines 2—2 of FIG. 1 and shows the size of the microsphere 1 with reference to the thickness of the foil 2. FIG. 3 illustrates a fuel plate before bonding the foils to each other. The top and bottom unperforated plates 3 are positioned above and below the foils 2 containing the microspheres 1. The microspheroidal particles described in U.S. Pat. 3,331,785, have unique physical and chemical properties that make then particularly desirable in the preparation of fuel plates. Although "microspheres" have been prepared by other described techniques, the particles prepared by these techniques do not have the desirable set of chemical and physical properties necessary for preparation of the fuel plates of our invention.

The spheres prepared according to the process described in U.S. Pat. 3,331,785, are highly spherical and can be produced in very closely controlled size ranges. Since this is the case, an array of cells of regular size and shape can be fabricated to accommodate these spheres. This is not possible where the particles have irregular sphericity and vary widely in size.

Since few of our spheres vary from sphericity, they can be more easily coated than poorly shaped particles. The coatings on these particles are uniform and have an excellent retentivity of fission products. Because the surface texture is smooth, the coatings are strong and have no tendency to weaken during fabrication or use in a reactor.

One of the principle problems encountered in the prior art microspheres characterized by poor sphericity and irregular surface results from the tendency of uranium to migrate through the coating at points where surface irregularities exist.

In the classical process of sphere formation, high temperatures are required to spheroidize the irregular shaped particles and to achieve composition uniformity or solid solution in binary or multi component systems. These high temperatures are incompatible with low density (50% to 80% of theoretical). In the process described in the 785 patent, solid solution and spheroidization is achieved in materials that have been treated at temperatures of 80 to 100° C.

These microspheres can be prepared in sizes from about 50 to 3000 microns and can be prepared to have a narrow size distribution in this range. The densities can vary from about 50% to greater than 90% of theoretical. They can be prepared to contain other materials, such as zirconia, for example, that improve the physical properties of the actinide oxide fuel. The microsphere route also provides a convenient means for introducing nuclear poisons, such as samarium, for example, to the fuels when desired. The microsphere route also provides a convenient means of introducing neutron poisons, or neutron moderating materials. Boron containing compounds such as $B_4C$, for example, may be added to the fuels when desired.

Fuel elements have been prepared by randomly mixing the microspheres into the metal powders. The microsphere containing powders are then pressed and rolled to form a plate. Although the introduction of microspheres greatly improved the prior process where the particles were not uniform in size or shape, the method has been limited to a microsphere loading, and consequently a fuel loading of 15 volume percent or less. More frequently, loadings are restricted to ten or twelve volume percent. At loadings higher than this, many microspheres come into contact with each other, consequently causing interparticle fracture during the rolling operation. This fracture leads to interconnected porosity, which is a condition deleterious to the corrosion, heat transfer properties, and safe operation of the fuel plate.

The demands for safe, efficient fuels that can be operated to high burnups at high temperatures have motivated the development of coated particle fuels. Currently available techniques for fabrication of fuel elements matrices, however, have not kept pace with the development in fuel particle technology. Our invention provides a matrix and a process for manufacturing said matrix which will protect the fuel from the reactor coolant, thereby protecting the fuel from deleterious chemical reactions; minimize the release of fission products into the coolant; contain the fuel and prevent its diffusion or migration at high operating temperatures; allow a void volume to accommodate the swelling of the fuel particle during the accumulation of fission products; restrict the damage caused by fission product recoil to a microscopic region; and provide a fabrication technique which will allow higher fuel volume loadings than currently available.

The fuel foils and fuel plates manufactured by our process may be utilized in a reactor in a variety of geometric configurations. For example, the foils may be unitized to produce a series of stacked plates interspersed with channels to allow the flow of coolant, or the plates may be unitized in an open cylindrical configuration. A series of concentric cylindrical fuel elements interspersed with channels for gaseous or fluid coolant could also be produced by our process.

The coated spherical particle dispersed in the fuel element of our invention may also be used with great advantage in the so called "seed-and-blanket" reactor. The seed-and-blanket reactor is aimed at obtaining the maximum power output from natural uranium or thorium. The blanket of natural uranium or thorium captures a large fraction of the excess number of neutrons over those required to maintain the chain reaction. The blanket breeds fissile material by producing $Pu^{239}$ or $U^{233}$. Thus the minimum investment and expenditure of $U^{235}$ or thorium are achieved. The plutonium generated is burned in situ in the core and minimum core size for a given power output is achieved. As the lifetime of the core increases, there is a gradual increase in the ratio of power produced in the blanket to that produced in the seed. An advantage of the seed-blanket system is that it avoids the power "peaking" in the center of a uniformly loaded core.

Our invention provides a means for fabricating a nuclear reactor or core whereby the respective seed-and-blanket components may be suitabley distributed either within a given foil, or fuel plate, or collection of fuel plates or any desired combination of these.

After the fuel has been in the reactor for sometime, it is removed from the reactor and reprocessed. The fuel, after reprocessing, is returned to the customer for fabrication into additional fuel elements.

Our novel process provides a fuel source wherein the fuel is easily separated from the matrix and thus affords a method of reducing reprocessing costs.

It is another object of these inventions to minimize fuel fabrication damage in nuclear fuel metal plate dispersions.

It is still another object of these inventions to provide high fuel loadings and high fuel burnup in a fuel element having a nuclear fuel dispersed in a zirconium metal or Zircalloy matrix.

It is still another object of these inventions to prepare fuel elements in the form of plates that contain neutron poisons and or moderating materials.

It is a further object of these inventions to prepare fuel plates that provide a means of extending the life of the fuel cores in a nuclear reactor.

The instant application covers the broad general principles involved in the processes for preparing these fuel elements. Application Ser. No. 710,708 covers the application of these techniques to the preparation of fuel plates using high density microspheres. Application Ser. No. 710,707 is directed to the process modifications peculiar to the preparation of these fuel elements where the fuel particles have a density as low as 50 percent of theoretical.

For purposes of this application, the spaces in the foils occupied by the microspherical fuel element are designated cells. Each of these cells has a critical dimension. The diameter of the cell is the same as the thickness of the foils and the diameter of the microsphere. This provides a uniform distance between the spheres.

The most advantageous arrangement of these cells in the fuel plate is the close-packed array. In contrast to the random distribution discussed previously using the close-packed array, it is possible to achieve a fuel loading of greater than 24 percent. In this system, the cells in the individual foils are positioned in a manner such that, when the foils of the metal being used in the matrix are assembled, the fuel microspheres are in contact with the matrix metal at the top and bottom as well as at the sides of the individual cells. The critical dimension of the cell is such that each of the fuel particles are separated from the adjoining fuel particle by a distance equal to the diameter of the fuel particle.

Another important consideration common to this application and applications Ser. No. 710,707 and 710,708, filed of even date herewith, is the selection of the fuel matrix material. The foils can be metals such as aluminum, aluminum alloys, stainless steel, the various Zircalloy materials as well as zirconium metal. In addition, the matrix material may be essentially non-metallic and be made up of graphite beryllia or alumina.

After the matrix material has been selected, the next step in the process is the impression of the individual cells in each of the foils. This may be accomplished by any suitable technique such as drilling, forging, casting, stamping, or etching. One of the problems encountered in drilling is the presence of burrs in the finished product. This problem can be overcome by the technique known as double drilling where the drill is first run part way into the foil and the foil is reversed and the drill passed entirely through the foil from the reverse side. This drilling technique facilitates loading of the spherical particles. Another particularly convenient method of preparing the cells is the etching technique, particularly when the foil used to prepare the matrix material is a low cost metal that reacts vigorously with mineral acid. In this technique, the foil such as an aluminum foil, for example, is covered with a polymer precursor material. The coating is polymerized in a definite pattern using a light source, for example. The unpolymerized portion of the precursor is then removed thus exposing the metal beneath. The areas not protected by a plastic coating are etched by an acid or other similar etchant. In the final step of the process, the etchant is washed away, the plastic removed, and the foil is then ready for loading and assembling into the fuel element.

In the next step of the process, the microspheres are positioned in the individual foils. This loading can be accomplished by vibration, pressing, or any other suitable means.

In the last step of the process, the individual foils, making up the fuel plate, are bonded together. Since it is generally desirable to exclude air from the space in the cells not occupied by the particles as well as from the fuel themselves, this bonding is most advantageously done under vacuum or in the presence of an inert gas, such as nitrogen, helium, argon, etc. This may be done using different techniques. Where the sphere is of maximum density, and it is desirable to retain some void space in each of these cells to aid in the collection of fission products and to allow space for swelling of the individual microspheres, the foils are assembled and bonded by pressing or some other means that allows retention of some or all of the residual void space in the cells. Where the fuel particles have a relatively low density, another technique is employed. In this technique, the bonding is completed in such a manner that the individual cells are collapsed and have essentially a square configuration. This type of technique is discussed in detail in application Ser. No. 710,707.

Embodiments of the general process for producing the fuel elements as described and illustrated in the following specific, but non-limiting examples.

EXAMPLE I

This example demonstrates the principles of our invention using non-nuclear components. Six pieces of transparent plexiglass 1/8" x 4" x 12" were obtained. These plates simulate the internal slabs of the fuel element. Two pieces of plexiglass with the dimensions 1/4" x 4" x 12" were used to form the top and bottom of the fuel element and to contain the slabs containing the fuel particles. The four internal pieces were drilled with 1/8" diameter holes arranged in 13 alternating rows containing 34 and 33 holes each. The drilled center portion of each plate measured 8 3/8" x 1 5/8". The distance from hole to hole is the same as the diameter of the hole; namely, 1/8". The row below a given row is indented by 1/8" in order to form a closely packed distribution of holes.

Each of the holes was then filled with uniform 1/8" diameter spherical metal particles simulating coated microspherical nuclear fuel particles. After loading, individual slabs were stacked in such a manner as to produce the closest possible packing as shown on the attached drawing. The slabs were placed in such a manner that the particle in a given hole is just below the 1/8" inter-particle space of the slab above it. After assembling the six slabs containing the simulated fuel particles, the 1/4" Plexiglass sheets were placed in the top and bottom of the assembly to act as container walls. Holes were drilled through the entire assembly and the assembly was finally locked together by means of bolts and butterfly nuts through the holes.

EXAMPLE II

A plate mock up in plexiglass was prepared using materials having the same dimensions as in Example I. The foils were drilled to provide the same number of cells. The bottom sheet of plexiglass was attached to the first sheet containing the cells and the other sheets were left unassembled to provide a demonstration of the method of loading the fuel-bearing foils in preparation of plates to be used in a reactor.

EXAMPLE III

This example demonstrates a method for bonding the fueled foils into a unitized fuel plate. A total of fifteen Zircalloy foils, each being 6 mils thick, were assembled. The foils were bonded using a hot pressing technique.

The metal foils were initially cleaned in hexane which serves as a degreasing bath. After degreasing in hexane, they were mechanically abraded with 60 grit silicone carbide abrasive paper. The foils were then scrubbed in a solution of Alconox for 5 minutes at 200° F., and ultrasonically cleaned in an Alconox bath for 5 minutes at 165° F. They were then rinsed in warm distilled water and brushed clean in warm distilled water, followed by immersion in a 3% HCl solution at room temperature for 5 minutes. The foils were rinsed twice in warm distilled water and blown dry with filtered argon.

The surfaces of the mold steel that come in contact with the metal foil during bonding were then coated with a thin coat of Aquadag and vacuum baked at 750° F. for 30 minutes, cooled to room temperature and then the excess carbon residue wiped off. The metal foils were then placed over the containers and the containers were sealed except for a small corner of heli-arc welding techniques in an inert atmosphere chamber. Final sealing is performed in an electron beam welding chamber.

Gas pressure bonding was performed at 1550° F. at 10,000 p.s.i. for 3 hours. The bonded parts were then removed from the mild steel containers by selective leaching in nitric acid. The bonded materials were examined nondestructively by liquid crystal technique.

EXAMPLE IV

The process of Example III was used to prepare a plate structure having 5 foils instead of fifteen. The plate prepared had the same combination of advantageous properties.

EXAMPLE V

Microspheres were prepared using the hot column techniques described in U.S. Pat. 3,331,785.

The microspheres were coated with niobium metal to a thickness of 8 microns. The coated microspheres had a diameter of 6 mils.

A Zircalloy foil of 6 mil thickness was impressed with a series of holes to prepare cells 6 micron in diameter. The coated spheres were manually positioned in the cells of the foils to prepare a demonstration fuel load foil.

EXAMPLE VI

A high resolution X-ray plate was removed from storage and placed emulsion side up. The loaded fuel foil was placed on top of the high resolution X-ray plate.

The high resolution plate and the fuel plate were mounted in a 6 x 9 plate holder. The holder is mounted in the camera and attached to the X-ray unit. X-ray exposure was made with 50 kv. 40 ma. for 10 minutes. The light cover was then replaced on the camera and the plate holder was taken to the darkroom. The exposed film was removed and developed using a commercially available developer full strength for a period of 5 minutes. The plate was fixed for 2 minutes and washed for 5 minutes. The plate was photographed. The photo clearly showed the distribution of the fissile material distributed in the foil.

EXAMPLE VII

This example demonstrates a method of fabricating an array of cells in a metal foil by suitably etching the foil.

A 304 stainless steel foil measuring 1 3/8" x 7/16" x 0.006" was washed in methyl alcohol. The surface was polished with jeweler's rouge and washed with water. It was then immersed for 20 minutes in a 20% solution of nitric acid and water at 70° C., rinsed in running distilled water and air dried.

The metal foil was transferred to a dark oven and dipped in a 50:50 solution of Kodak Metal Etch Resist in Metal Resist Thinner and air dried for 10 minutes, then placed in a light tight box and dried in an oven at 110° C. for 15 minutes. The sample was cooled. A transparency consisting of an array of 25 mil dots on a clear background was placed on top of the metal. Good contact was achieved by sandwiching the coated metal and the transparency between two glass plates. The sandwich was exposed to bright sunlight for 3 minutes. The reverse side of the metal was exposed to bright sunlight for 3 minutes but without an overlay transparency.

The exposed sample was immersed for 2 minutes in Kodak Metal Etch Resist Developer and then washed under running water for 1 minute. This treatment removed adhering polymer from the metal which was not exposed because of the dark portions of the transparency.

The coated sample was immersed in a solution containing 1 volume of concentrated hydrochloric acid in three volumes of water and connected to anode of a 6 volt battery. A stainless steel sheet was made the cathode. After 5 minutes, the holes were etched through, the sample was removed, washed, and the polymer layer removed by wiping with steel wool.

EXAMPLE VIII

This example describes another simulated fuel plate fabrication technique.

An aluminum box, whose outside dimensions were 1⅝" x 3" was made from ⅛" x ⅛" spacers at the sides and end onto which were attached a .040" aluminum sheet. A cover was made from aluminum stock in the shape of a T. The narrow portion being ⅛" thick x ⅛" in depth fitted snugly into the box. The outer portion was made flush with the outside of the box.

The box is filled with metal balls that are slightly under ⅛" in diameter. The balls are disposed in the box in a series of staggered rows in the manner of orthorhombic packing.

The cover is replaced and the assembly used to simulate a fuel element prepared in this manner.

What is claimed is:

1. A process for directly forming a fuel assembly suitable for use in a nuclear reactor which comprises perforating a foil consisting of zirconium, aluminum, stainless steel, Zircalloy, aluminum alloys, graphite, alumina, or beryllia, to form a series of cells of a size large enough to accommodate microspheres having diameters of 50 to about 1000 microns, inserting sintered microspheres of uniform size and fissile material in said cells, bonding by pressing said foil to additional fuel-bearing foils and to unperforated foils positioned at the top and bottom of the assembly and recovering the product assembly.

2. The process according to claim 1 wherein the microspheres are of a fissile material selected from the group consisting of $U^{235}$, $Pu^{239}$, and $U^{233}$ and have a size in the 50 to 750 micron range.

3. The process according to claim 2 wherein the fissile material in said cells is a mixture of $U^{238}$ and thorium 232.

4. The process according to claim 1 wherein the microspheres of nuclear poisons and moderating materials are interspersed with the fissile material in the foils.

5. The process according to claim 1 wherein said foils are impressed with cells by coating said foil with an acid resistant plastic material, removing said plastic selectively in a definite pattern and etching said plate with an acid to form the cells.

6. The process according to claim 1 wherein said plates have a fuel loading in excess of 15 volume percent.

References Cited
UNITED STATES PATENTS

| | | | |
|---|---|---|---|
| 2,491,320 | 12/1949 | Koontz | 264—.5X |
| 2,996,443 | 8/1961 | Schaner | 176—75 |
| 3,008,884 | 11/1961 | Schippereit et al. | 176—86 |
| 3,097,152 | 7/1963 | Walker | 176—75X |
| 3,103,478 | 9/1963 | Kooistra | 176—86 |
| 3,141,227 | 7/1964 | Klepfer et al. | 176—86X |
| 3,270,412 | 9/1966 | Vordahal | 29—472.3 |
| 3,368,261 | 2/1968 | Pauls | 29—480X |

REUBEN EPSTEIN, Primary Examiner

U.S. Cl. X.R.

176—68, 82